United States Patent
Muskos

(10) Patent No.: US 9,610,910 B2
(45) Date of Patent: Apr. 4, 2017

(54) BUMPER FOR A VEHICLE

(75) Inventor: Per Muskos, Lulea (SE)

(73) Assignee: Gestamp Hardtech AB, Lulea (SE)

( * ) Notice: Subject to any disclaimer, the term of this patent is extended or adjusted under 35 U.S.C. 154(b) by 83 days.

(21) Appl. No.: 13/261,082

(22) PCT Filed: Jun. 30, 2009

(86) PCT No.: PCT/SE2009/000333
§ 371 (c)(1),
(2), (4) Date: Dec. 12, 2011

(87) PCT Pub. No.: WO2011/002344
PCT Pub. Date: Jan. 6, 2011

(65) Prior Publication Data
US 2012/0223536 A1    Sep. 6, 2012

(51) Int. Cl.
*B60R 19/18* (2006.01)
*B60R 19/34* (2006.01)

(52) U.S. Cl.
CPC ............ *B60R 19/18* (2013.01); *B60R 19/34* (2013.01); *B60R 2019/1813* (2013.01)

(58) Field of Classification Search
CPC .. B60R 19/18; B60R 19/34; B60R 2019/1813
USPC ............ 296/187.01, 187.03, 187.09, 203.02, 296/193.09, 205; 293/102, 120, 122, 132, 293/133, 138, 139, 149, 151, 152, 153, 293/155
See application file for complete search history.

(56) References Cited

U.S. PATENT DOCUMENTS

| | | | | |
|---|---|---|---|---|
| 1,463,581 A | * | 7/1923 | Hathaway | B60R 19/285 293/153 |
| 2,186,505 A | * | 1/1940 | Tibbetts | B60R 19/42 280/848 |
| 6,299,226 B1 | * | 10/2001 | Kroning et al. | 293/120 |
| 6,779,821 B2 | * | 8/2004 | Hallergren | 293/133 |
| 6,932,398 B2 | * | 8/2005 | Frank | 293/155 |
| 6,971,691 B1 | * | 12/2005 | Heatherington et al. | 293/102 |
| 7,077,442 B2 | * | 7/2006 | Arns | 293/155 |
| 7,357,432 B2 | * | 4/2008 | Roll et al. | 293/133 |
| 7,559,589 B2 | * | 7/2009 | Nees | 293/154 |
| 2007/0040398 A1 | * | 2/2007 | Lutke-Bexten et al. | 293/102 |
| 2010/0320781 A1 | * | 12/2010 | Steiner | 293/132 |

FOREIGN PATENT DOCUMENTS

| | | | | |
|---|---|---|---|---|
| DE | 10156655 A1 | | 6/2003 | |
| DE | 10223674 A1 | | 12/2003 | |
| EP | 908356 A1 | * | 4/1999 | ............ B60R 19/04 |
| EP | 0908356 A1 | | 4/1999 | |
| SE | 532308 C2 | | 12/2009 | |

* cited by examiner

*Primary Examiner* — Jason S Morrow
*Assistant Examiner* — E Turner Hicks
(74) *Attorney, Agent, or Firm* — Mark P. Stone

(57) ABSTRACT

A bumper with integrated crumple is formed from a central beam (11) and two outer beams (12, 13), the ends of the central beam and adjacent ends of the outer beams being curved and welded together to form crash boxes (14, 15).

5 Claims, 2 Drawing Sheets

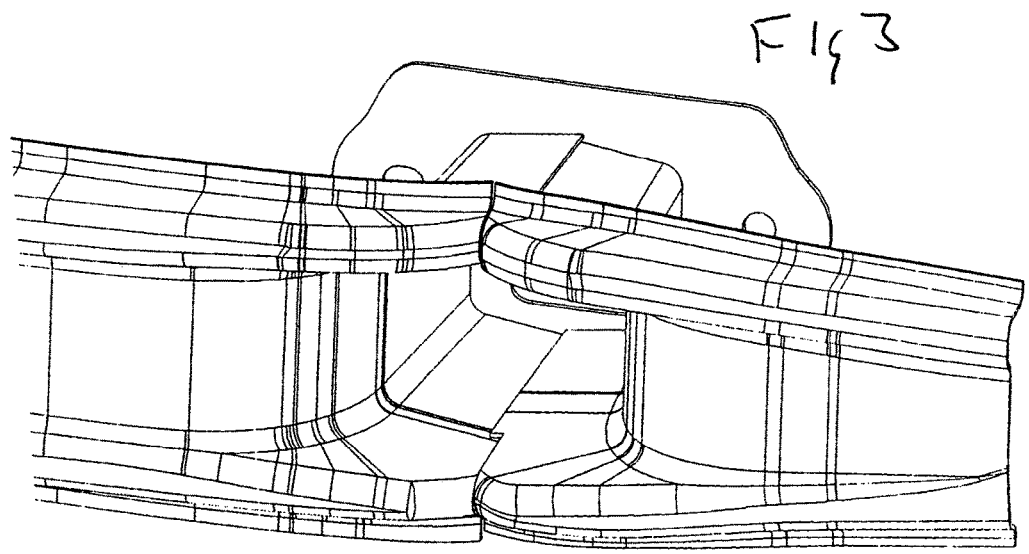
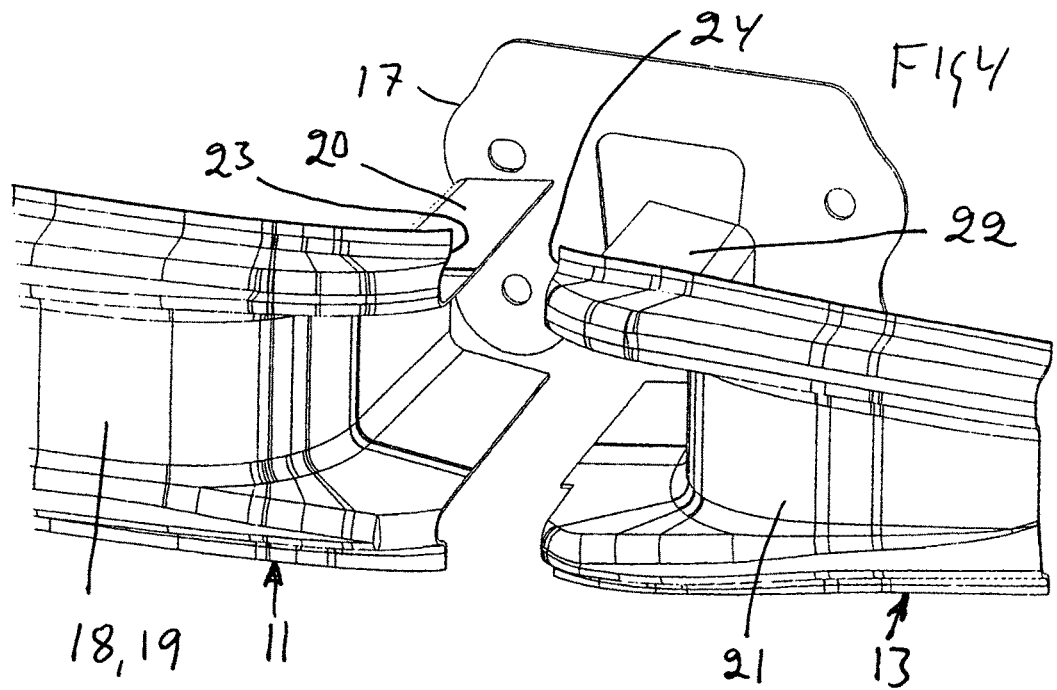

BUMPER FOR A VEHICLE

TECHNICAL FIELD OF THE INVENTION

The invention deals with a bumper for a vehicle, comprising a bumper beam and two crash boxes with closed profile. The bumper beams are oriented transverse to the vehicle, while the crash boxes are oriented along the vehicle and are fastened to the vehicle.

PURPOSE AND BRIEF DESCRIPTION OF THE INVENTION

One purpose of the invention is to simplify and economise on the manufacture of a bumper of this kind. This is achieved in that the bumper beam comprises a central beam and two outer beams, the ends of the central beam and the adjacent ends of the outer beams being curved and welded together to form the crash boxes.

BRIEF DESCRIPTION OF THE DRAWINGS SHOWING A SAMPLE EMBODIMENT OF THE INVENTION

Figure 1:
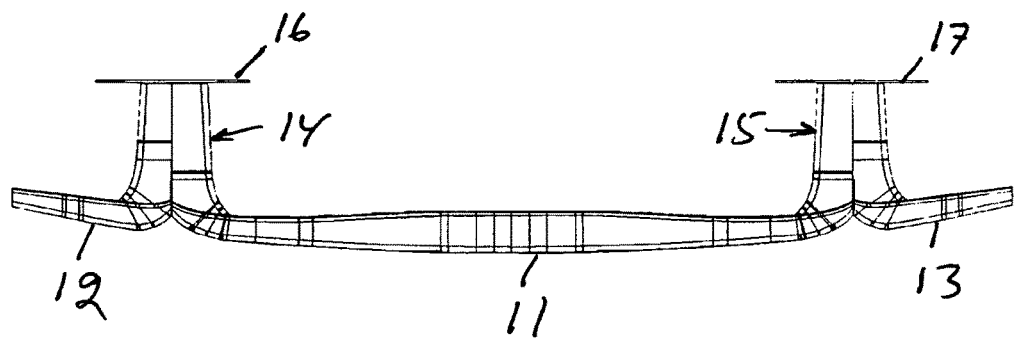
Figure 2:
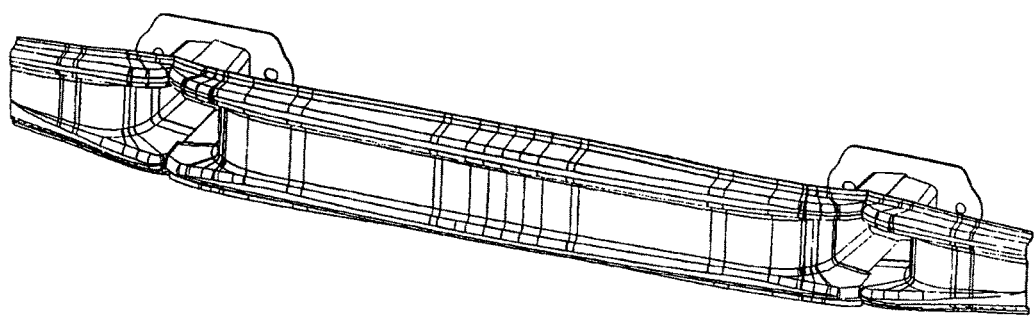

FIG. 1 is a top view of a bumper.
FIG. 2 is a perspective view of the same bumper.
FIG. 3 shows a magnified view of part of the bumper in FIGS. 1 and 2.
FIG. 4 is an exploded view of FIG. 3.

DETAILED DESCRIPTION OF THE ILLUSTRATED AND PREFERRED EXAMPLE OF THE INVENTION

The bumper shown in the figures consists of a central beam 11 and two outer beams 12,13 and the three beams are welded together and form integrated crash boxes 14,15 which have fastening plates 16,17 for attachment to supporting parts of the vehicle, often for attachment to corresponding fastening plates on the side rails of the vehicle. All three beams have a U-profile with the opening toward the vehicle. The ends of the beams facing each other are curved toward the vehicle and form in pairs crash boxes which are thus integrated parts of the beams.

As illustrated by FIG. 1 of the drawing, the two outer beams 12,13, respectively, extend only in an outward direction from the opposed ends of the central beam 11.

FIGS. 3 and 4 show a magnified view of the crash box 15 and adjacent parts of the beams 11 and 13. The larger part of the central flange 18 of the central beam consists of a broad middle groove 19. As best seen in FIG. 4, the exploded view, the middle groove deepens toward the curved ends so that the central beam has an inverted U profile 20 there. The outer beam 13 has a corresponding appearance with a middle groove 21 and this beam also has an inverted U profile 22 at the curved ends. The two U-profiles 20 and 22 and their extensions in the form of the end edges 23, 24 of the original U-profiles are placed against each other and welded together. One edge of the inverted U-profile is preferably placed overlapping the other to provide a stronger joint, as shown in FIG. 3.

The two inverted U-profiles 20,22 thus form crash boxes 15 having a closed cross section and oriented in the lengthways direction of the vehicle, i.e., transverse to the bumper beam 11,12,13 and integrated with it. The fastening plate 17 is welded to the ends of the two inverted U-profiles 20,22.

Crash box 14 is formed in the same way.

The invention claimed is:

1. Bumper for a vehicle, comprising a bumper beam and two crash boxes with closed profile, wherein the bumper beam comprises a single central beam (11) and two outer beams (12, 13) extending only in an outward direction from opposed ends of said central beam, the two outer beams being arranged such that the outermost ends thereof extend outwardly beyond the respective outermost ends of the central beam, the ends of the central beam and adjacent ends of the outer beams being curved and welded together to form the crash boxes (14, 15).

2. Bumper according to claim 1, wherein the ends of the crash boxes are welded to a fastening plate (16).

3. Bumper according to claim 1, wherein the three beams (11, 12, 13) have a U-profile with its opening toward the vehicle and these profiles are inverted where they form the crash boxes (14, 15).

4. Bumper according to claim 2, wherein the three beams (11, 12, 13) have a U-profile with its opening toward the vehicle and these profiles are inverted where they form the crash boxes (14, 15).

5. Bumper according to claim 1, wherein the portions of the central beam and the outer beams forming the crash boxes are contiguously abutting throughout substantially the entire length of the crash boxes.

* * * * *